Patented Oct. 10, 1950

2,525,620

UNITED STATES PATENT OFFICE 2,525,620

PROCESS FOR THE PREPARATION OF AROMATIC ORTHODINITRILES

Mario Scalera and Robert E. Brouillard, Somerville, N. J., assignors to American Cyanamid Company, New York, N. Y., a corporation of Maine No Drawing. Application August 8, 1946, Serial No. 689,181

15 Claims. (Cl. 260—465)

This invention relates to a process for the preparation of ortho dinitriles from ortho dicarboxylic acids and their anhydrides.

Aromatic ortho dinitriles, particularly phthalonitrile and its derivatives, have achieved a large scale technical use in the production of phthalocyanine pigments. While a number of processes for the production of the ortho dinitriles have been proposed, the one commonly used involves the catalytic vapor phase reaction of the dicarboxylic anhydride or imide with ammonia. This process is effective if carefully controlled and used on a large scale, but requires expensive and elaborate equipment and is usable only with anhydrides or imides which can be readily volatilized without decomposition. There has therefore been a considerable need for non-catalytic processes, of which several have been proposed. Phthalamides have been dehydrated in solution in a tertiary base by means of phosgene or halogen compounds of phosphorus and sulfur. The diammonium salts have likewise been dehydrated under similar conditions. These processes have not been practical for large scale operation because of the cost of the starting materials and the number of steps in the process. For example, diammonium salts must be isolated from aqueous solution and dried, which is a difficult process, as the salts tend to lose ammonia on heating. The diamides are also expensive because their production requires a number of complicated steps involving the conversion of the dicarboxylic acid to its imide under anhydrous conditions, isolation of the imide, reaction with excess aqueous ammonia to form a diamide, and isolation and drying.

The present invention deals with a process in which the diamide is produced and is then dehydrated by means of phosphorus oxychloride. The disadvantages of the prior processes are avoided and a practically usable procedure results. We have found that if a suspension of the cyclic imide of the ortho dicarboxylic acid in a water immiscible organic solvent is treated with definite amounts of concentrated aqueous ammonia to convert it into the corresponding diamide and the water then removed by azeotropic distillation, the expensive steps of isolation, purification, drying, etc. are avoided, and at the same time the decomposition of the diamide which results when it is heated in the presence of water, is not observed. The dry dispersion of diamide may then be heated with phosphorus oxychloride in the presence of a tertiary organic base which acts as an acid binding agent to give the dinitrile. The present invention is not concerned broadly with the method by which the cyclic imide is produced. However, it is preferred to use a process in which the corresponding anhydride is reacted with urea in the presence of the same organic liquid which is used in the next step of producing the diamide. This procedure utilizes the same reacting medium for two steps and is therefore preferred, although the invention is not broadly limited thereto.

The amount of concentrated aqueous ammonia used is very critical and this is the principal and novel feature of the present invention. The lower limit is the stoichiometric equivalent which is theoretically needed to transform the imide into a diamide. The top limit is slightly below 5 equivalents. If more than 5 equivalents are used the diamide is produced in the reaction mixture but during the azeotropic drying considerable decomposition of the diamide to the imide results. The above represents the broadest limits within which the improved process of the present invention can be used at all. However, we prefer to use a moderate excess of ammonia and the preferred range is therefore from about 2 equivalents to about 4 equivalents. Within this range optimum results are obtained with maximum reliability.

The concentration of the aqueous ammonia is not extremely critical. However, excess water has the same undesired effect as excess aqueous ammonia, and for this reason we prefer to use ammonia of at least 20% concentration, and preferably from 28 to 30%.

The tertiary nitrogenous base used in the dehydration step is not critical either in amount or nature as long as it does not contain reactive hydrogen. Enough must of course be used to neutralize the hydrochloric acid formed by the dehydration reaction with phosphorus oxychloride. This constitutes 4 mols per mol of the diamide used. A small excess is desirable and is preferred as it insures complete reaction. Large excesses may be used but are uneconomical and therefore not preferred. The upper limit, being almost purely dictated by economics, is therefore not a critical one.

It is a further advantage of the present invention that the amount of phosphorus oxychloride to be used in the last step is likewise not critical. The minimum amount for good results is approximately 2 mols per mol of the diamide. We prefer to use from 2 to 3 mols. Larger amounts may be used but they are uneconomical and present some difficulties in the removal of the phosphorus compounds which are formed.

The process of the present invention, requiring no isolation or transfer of the charge in any step, is simple and economical to operate and gives good yields of the dinitriles of good purity. It is an especial advantage that the process may be used in the production of dinitriles which cannot be volatilized without decomposition. These dinitriles can be produced at a reasonable cost and with good yield by the present process, whereas they cannot be so produced by many of the processes proposed hitherto.

The inert organic solvents used in the first step of the present process may be almost any inert organic liquid boiling between 100–250° C. Typical examples are aromatic hydrocarbons such as toluene and xylene, chlorinated aromatic hydrocarbons such as monochlorobenzene, nitrobenzene, aliphatic hydrocarbons, chlorinated aliphatic hydrocarbons such as acetylene tetrachloride, and the like.

Almost any of the typical tertiary amines without active hydrogen may be used in the dehydration step. Typical examples are pyridine and its homologues, quinoline and its homologues, dimethylaniline, diethylaniline, trialkylamines such as triethylamine and the like. The process is applicable to the imides of any aromatic o-dicarboxylic acid. Examples of such ortho dicarboxylic acids are phthalic acid, 3- and 4-nitrophthalic acid, 3- and 4-chlorophthalic acid, 3-acetylaminophthalic acid, 3,4- and 4,5-dichlorophthalic acid, tetrachlorophthalic acid, napthaline-o-dicarboxylic acid such as napthaline 1,2-dicarboxylic acid, anthraquinone 2,3-dicarboxylic acid, heterocyclic o-dicarboxylic acid such as quinolinic acid.

The invention will be described in the following specific examples, the parts being by weight.

*Example 1*

A mixture of 148 parts of phthalic anhydride, 60 parts of urea and 700 parts of monochlorobenzene is refluxed vigorously for several hours. The reaction mixture is then cooled to 25° C. and 100 parts of concentrated aqueous ammonia (25%) was added. The reaction mixture was stirred at 25–30° C. until diamide formation is substantially complete. The temperature is then raised and the water-monochlorobenzene azeotrope distilled off. If necessary the liquid level is maintained during the removal of water by the addition of the requisite amount of monochlorobenzene.

When all of the water is removed the mixture is cooled to 65° C. and 300 parts of pyridine added. Then 300 parts of phosphorus oxychloride are introduced with vigorous stirring, a temperature being maintained at 65–70° C., and the stirring continued for some time after the addition of phosphorus oxychloride is complete to permit the dehydration of the dinitrile to proceed to completion. The mixture is then drowned in 2000 parts of ice and 1000 parts of water with vigorous stirring.

The phthalonitrile slurry is freed from pyridine and monochlorobenzene by boiling and the aqueous slurry then filtered. The wet cake is dried at 65–70° C. and extracted with 2% sodium hydroxide solution. A phthalonitrile is obtained in good yield which melts at 138–139° C.

*Example 2*

A mixture of 193 parts of 3-nitrophthalic anhydride, 60 parts of urea and 70 parts of monochlorobenzene is refluxed vigorously for several hours. The reaction mixture is then cooled to 25° C. and 10 parts of 28% aqueous ammonia added. Stirring is maintained for several hours at 25–30° C. until diamide formation is complete. The temperature is then raised and the water-monochlorobenzene azeotrope is distilled off. If necessary the liquid level is maintained during the distillation by the addition of the necessary amounts of monochlorobenzene.

When all of the water is removed the mixture is cooled to 65° C. and 30 parts of pyridine added. 30 parts of phosphorus oxychloride is then introduced with vigorous stirring, maintaining the temperature at 65–70° C., the stirring being continued for some time after the phosphorus oxychloride is added to permit the dehydration of the dinitrile to proceed to completion. The mixture is then drowned in 200 parts of ice and 100 parts of water with vigorous stirring.

The 3-nitrophthalonitrile slurry is freed from pyridine and monochlorobenzene by boiling and the aqueous slurry then filtered. The wet filter cake is then reslurried with a 2% sodium hydroxide solution, filtered, and the cake washed alkali free and dried at 60° C. A good yield of 3-nitrophthalonitrile is obtained which, after one recrystallization from ethyl alcohol melts at 141–143° C.

*Example 3*

A mixture of 193 parts of 4-nitrophthalic anhydride, 60 parts of urea, and 70 parts of mixed xylenes was refluxed vigorously for 2 hours. The reaction mixture was then cooled to 25° C. and 10 parts of concentrated aqueous ammonia (28%) was added. The mixture was stirred for 2 hours at 25–30° C., after which it was boiled while distilling off the water-mixed xylene azeotrope. The liquid level was maintained during this operation by adding mixed xylenes.

When all of the water had been removed the mixture was cooled to 65° C. and 30 parts of pyridine was added. 30 parts of phosphorous oxychloride was then added to the vigorously stirred mixture over one-half hour while maintaining the temperature at 65–70° C. The temperature was maintained at 65–70° C. for 1 hour after the phosphorous oxychloride addition. The reaction mixture was drowned into 200 parts of ice and 100 parts of water with vigorous stirring.

The 3-nitrophthalonitrile slurry was freed from pyridine and mixed xylenes by boiling and the solid product removed from the aqueous slurry by filtration. The product was dried at 60° C.

*Example 4*

A mixture of 14.8 parts of phthalic anhydride, 6.0 parts of urea, and 70 parts of monochlorobenzene was refluxed vigorously for 2 hours. The reaction mixture was then cooled to 25° C. and 10 parts of concentrated aqueous ammonia (28%) was added. The mixture was stirred for 2 hours at 25–30° C. after which it was boiled while distilling off the water-monochlorobenzene azeotrope. The liquid level was maintained during this operation by adding monochlorobenzene. When all of the water had been removed the mixture was cooled to 65° C. and 30 parts of dimethylaniline was added. 30 parts of phosphorous oxychloride was added to the vigorously stirred mixture over one-half hour while maintaining the temperature at 65–70° C. The temperature was maintained at 65–70° C. for 1 hour, after the phosphorous oxychloride addition. The mixture was then drowned into 200 parts of ice and 100 parts of water with vigorous stirring. The phthalonitrile slurry formed was freed from dimethylaniline and monochlorobenzene by boiling and the solid removed from the aqueous slurry by filtration. The wet cake was dried at 65–70° C.

We claim:

1. In the manufacture of aromatic orthodinitriles from the anhydrides of aromatic orthodicarboxylic acids wherein all reactions are effected in the presence of an inert, water-immiscible, liquid organic solvent having a boiling point between 100° and 250° C., the new and improved method which comprises forming a mixture of the anhydride, urea and said water-immiscible organic solvent and heating the mixture under reflux until the anhydride is converted into the corresponding aromatic orthodicarboxylic imide and a dispersion of said imide compound in said solvent is obtained, reacting the imide compound, in situ, in said water-immiscible solvent with 2 to 4 equivalents of concentrated aqueous ammonia to convert the said imide into the corresponding aromatic orthocarboxylic diamide, in situ, and removing the water by azeotropic distillation to produce a dispersion of the said diamide in said water-immiscible solvent, and reacting the diamide, in situ, in said organic solvent with at least 2 mols of phosphorus oxychloride and at least 4 mols of a tertiary nitrogen base at an elevated temperature to produce the corresponding aromatic orthodinitrile, in situ, and recovering the said ortho dinitrile from the reaction mixture.

2. The process of claim 1 wherein said organic solvent is monochlorobenzene.

3. The process of claim 1 wherein said anhydride is phthalic anhydride.

4. The process of claim 1 wherein said anhydride is 3-nitrophthalic anhydride.

5. The process of claim 1 wherein said anhydride is tetrachlorophthalic anhydride.

6. The process of claim 1 wherein said tertiary nitrogen base is pyridine.

7. The process of claim 1 wherein said tertiary nitrogen base is dimethylaniline.

8. The process of claim 1 wherein said anhydride is phthalic anhydride and said organic solvent is monochlorobenzene.

9. The process of claim 1 wherein said aromatic ortho dicarboxylic acid anhydride is a chlorophthalic anhydride.

10. The process of claim 1 wherein said aromatic ortho dicarboxylic anhydride is a nitrophthalic anhydride.

11. The process of claim 1 wherein said tertiary nitrogen base is a liquid tertiary nitrogen heterocyclic base.

12. The process of claim 1 wherein said liquid tertiary nitrogen base is a liquid N-dialkyl aromatic amine of the benzene series.

13. The process of claim 1 wherein said inert, water-immiscible organic solvent is a liquid aromatic hydrocarbon solvent.

14. The process of claim 1 wherein said inert, water-immiscible organic solvent is a liquid chlorinated aromatic hydrocarbon solvent.

15. The process of claim 1 wherein said inert, water-immiscible organic solvent is a liquid chlorinated hydrocarbon solvent.

MARIO SCALERA.
ROBERT E. BROUILLARD.

REFERENCES CITED

The following references are of record in the file of this patent:

UNITED STATES PATENTS

| Number | Name | Date |
|---|---|---|
| 2,054,088 | Linstead et al. | Sept. 15, 1936 |
| 2,262,262 | Speer | Nov. 11, 1941 |
| 2,387,435 | Fleysher | Oct. 23, 1945 |

FOREIGN PATENTS

| Number | Country | Date |
|---|---|---|
| 389,842 | Great Britain | Mar. 20, 1933 |

OTHER REFERENCES

Piutti, Gazz. Chim. Ital., vol. 12, pp. 169–170 (1882).

Aschan, Ber. Deut. Chem., vol. 19, pp. 1398–1401 (1886).

Dunlap, Am. Chem. J., vol. 18, page 333 (1896).

Tingle et al., J. Am. Chem. Soc., vol. 32, page 116 (1910).

Herzog, Z. Angew. Chem., vol. 32, page 301 (1919).

Young, "Distillation Principles and Proc.," MacMillan and Co. Ltd. (1922) pp. 190, 195.

MacArdle, "Solvents in Synthetic Org. Chem.," Van Nostrand (1925) pp. 1–3.

Mannessier-Mameli, Chem. Abstracts, vol. 36, col. 1029 (1942).